(12) United States Patent
Sonnekalb et al.

(10) Patent No.: US 7,093,112 B2
(45) Date of Patent: Aug. 15, 2006

(54) METHOD AND APPARATUS FOR CACHING SHORT PROGRAM LOOPS WITHIN AN INSTRUCTION FIFO

(75) Inventors: Steffen Sonnekalb, München (DE); Jürgen Birkhäuser, München (DE)

(73) Assignee: Infineon Technologies AG, Munich (DE)

( * ) Notice: Subject to any disclaimer, the term of this patent is extended or adjusted under 35 U.S.C. 154(b) by 561 days.

(21) Appl. No.: 09/953,723

(22) Filed: Sep. 17, 2001

(65) Prior Publication Data

US 2002/0073302 A1 Jun. 13, 2002

Related U.S. Application Data

(63) Continuation of application No. PCT/DE00/00653, filed on Mar. 2, 2000.

(30) Foreign Application Priority Data

Mar. 17, 1999 (DE) .................... 199 11 955

(51) Int. Cl.
*G06F 9/44* (2006.01)
(52) U.S. Cl. ..................... 712/241
(58) Field of Classification Search ........... 712/241
See application file for complete search history.

(56) References Cited

U.S. PATENT DOCUMENTS

| 4,566,063 A * | 1/1986 | Zolnowsky et al. ......... 712/241 |
| 4,626,988 A | 12/1986 | George |
| 4,876,642 A * | 10/1989 | Gibson ..................... 712/233 |
| 5,774,711 A * | 6/1998 | Henry et al. ................ 712/244 |
| 5,809,326 A | 9/1998 | Nogami |
| 5,951,679 A * | 9/1999 | Anderson et al. ........... 712/241 |
| 6,085,315 A * | 7/2000 | Fleck et al. ................. 712/241 |
| 6,125,440 A * | 9/2000 | Osovets ...................... 712/205 |
| 6,269,440 B1 * | 7/2001 | Fernando et al. ........... 712/241 |
| 6,401,196 B1 * | 6/2002 | Lee et al. .................... 712/241 |
| 6,598,155 B1 * | 7/2003 | Ganapathy et al. ......... 712/241 |

FOREIGN PATENT DOCUMENTS

| EP | 0 511 484 A2 | 11/1992 |
| JP | 58-159154 | 9/1983 |

OTHER PUBLICATIONS

InstantWeb. Online Computing Dictionary. http://www.instantweb.com/foldoc/foldoc.cgi?Free+On-line+Dictionary Search terms: Buffer and Queue.*
Rosenberg, Jerry M. "Dictionary of Computers, Information Processing & Telecommunications". Second Edition. New York: John Wiley & Sons, © 1987. p. 351.*

* cited by examiner

Primary Examiner—Eddie Chan
Assistant Examiner—Aimee Li
(74) Attorney, Agent, or Firm—Laurence A. Greenberg; Werner H. Stemer; Ralph E. Locher

(57) ABSTRACT

A method and an apparatus for reading instruction codes and for forwarding the corresponding instructions to the instruction unit that are distinguished, in particular, by buffer-storing the instructions of program loops that do not exceed the storage capacity of the instruction FIFO, in full, in the instruction FIFO. During a "loop mode", such program loops are then executed only from the instruction FIFO itself and the instructions do not need to be repeatedly reloaded from the memory. This loop mode is then maintained until the jump instruction at the end of the program loop finally refers to an instruction other than that at the start of the loop.

10 Claims, 2 Drawing Sheets

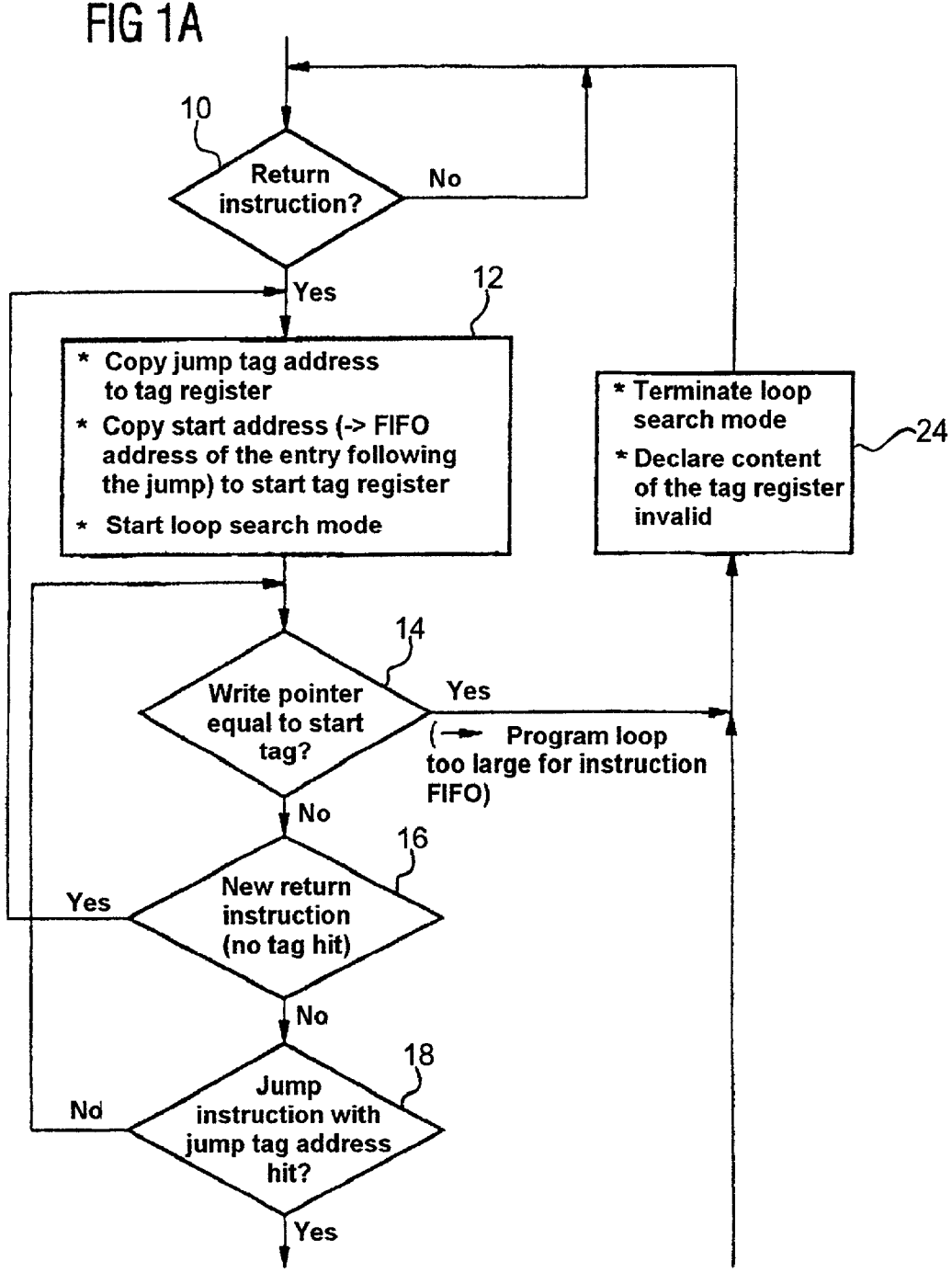

METHOD AND APPARATUS FOR CACHING SHORT PROGRAM LOOPS WITHIN AN INSTRUCTION FIFO

CROSS REFERENCE TO RELATED APPLICATION

This application is a continuation of copending International Application No. PCT/DE00/00653, filed Mar. 2, 2000, which designated the United States.

BACKGROUND OF THE INVENTION

Field of the Invention

The present invention relates to a method and to an apparatus for reading instructions from a memory apparatus and forwarding these instructions to the execution unit of a processor.

To execute a digital program, units of a processor, which are provided for this purpose, load instruction codes from a memory. This operation is also called instruction fetching. The units of the processor decode the instruction codes and then execute the instructions that have been obtained in this way. The basis for automatically reading the instruction codes is an "instruction counter", which contains the memory address of the next instruction to be executed. Once an instruction, which can have different lengths in the memory, has been read in, the instruction counter is incremented by the appropriate number of bytes, which means that it automatically points to the address of the next instruction to be processed in the memory.

The processing of different instructions includes a large number of similar execution states, each of which take up their own particular period of time. An individual instruction therefore, cannot be executed fully within a single clock cycle. To increase the processing rate, the processing of an instruction is therefore split into elemental tasks (e.g. calculation of the memory address, memory access, decoding of the instruction code, execution of the instruction, writing back the result). Each of these tasks is then performed in a different stage of an "instruction pipeline", with this ideally taking place in a single clock cycle. At any given instant, a plurality of instructions are then in a respectively different state of advancement in the instruction pipeline. Hence, although not every instruction is executed fully in just one clock cycle, the processing of one instruction is ideally completed in each clock cycle.

Instructions which have already been decoded are buffer-stored in an instruction FIFO (First-In-First-Out) until the instant at which they are forwarded to the execution unit of the processor. This instruction FIFO is a register file from which instructions that were stored first are also forwarded first. To manage this register file, two pointers, a read pointer and a write pointer, denote those registers of the instruction FIFO whose instructions are forwarded next or have information written to them next. During program execution, the two pointers circulate over the register file, with the write pointer trailing the read pointer and pointing to registers whose instructions have already been executed. In this way, a processor then uses the data bus in an ideal fashion. This is because, if an instruction is currently being executed which requires no direct memory access, for example, the addition of two registers, those registers of the instruction FIFO which contain instructions that have already been executed are automatically filled with new instructions from the memory. This is done without impeding the processing of the currently active instruction, with memory access by the active instruction naturally having priority over the filling of the instruction FIFO. In this way, immediately after an instruction has been executed by the execution unit, a new, already decoded instruction is available from the instruction FIFO and does not first need to be read from the memory. This method thus results in a uniform flow of instructions from the memory to the processor.

Conditional or unconditional jumps or branch operations can interrupt this uniform flow of instructions, however. These jumps alter the content of the aforementioned instruction counter. The result of this is that reading of the instruction codes needs to be continued at another location in the memory. However, calculating the subsequent jump address and also the memory access to the new instruction and the decoding require time, which means that the subsequent jump instruction cannot be forwarded to the instruction unit immediately. A jump instruction is detected during actual storage in the instruction FIFO, however. Hence, if the registers of the instruction FIFO contain other instructions which need to be executed before the jump instruction, this time can be used to read the subsequent jump instruction from the memory. Use of the instruction FIFO can thus hide a time loss caused by jump instructions.

Short program loops including just a few operations and a return instruction can impair the effectiveness of the instruction FIFO, however. Since a relatively large amount of time is required for memory access to the subsequent jump instruction, more than one instruction is normally forwarded from the instruction FIFO to the execution unit during this time. The number of already decoded instructions held in the instruction FIFO is thus reduced by the jump instruction. In the extreme case, if a large number of jump instructions appear within a short time during programming execution, the number of decoded instructions gradually decreases until the instruction FIFO is completely empty, which interrupts the continuous flow of instructions.

The above-described influence of jump instructions on the effectiveness of the instruction FIFO, which is caused by memory access to the new instruction codes, can be significantly reduced by using a cache memory. Nevertheless, access to a cache memory also requires much more time than an access to an instruction that is already held in the instruction FIFO, since the time required for decoding is another, additional factor, of course. Furthermore, the use of cache memories is associated with a significant increase in cost and with an increased space requirement.

SUMMARY OF THE INVENTION

It is accordingly an object of the invention to provide a method and an apparatus for reading instruction codes and for forwarding the corresponding instructions to the instruction unit which overcomes the above-mentioned disadvantageous of the prior art methods and apparatus of this general type. In particular, it is an object of the invention to provide a method for reading instruction codes and for forwarding the corresponding instructions to the instruction unit in which the time loss described above, which is caused by short program loops, is reduced using suitable measures. With the foregoing and other objects in view there is provided, in accordance with the invention, a method for reading instruction codes and for forwarding the corresponding instructions to the instruction unit that is distinguished, in particular, by buffer-storing the instructions of program loops that do not exceed the storage capacity of the instruction FIFO, in full, in the instruction FIFO. During a "loop mode", such program loops are then executed only from the instruction FIFO itself and the instructions do not need to be repeatedly reloaded from the memory. This loop mode is then maintained until the jump instruction at the end of the program loop finally refers to an instruction other than that at the start of the loop.

In accordance with an added mode of the invention, the method can include a loop search mode which is used to detect such program loops automatically and to load them into the instruction FIFO. Specific marking of short program loops—for example by a marking code within the program code—is thus not necessary. In this context, the method for detecting the loops is designed such that it does not use any clock cycles of the processor and thus cannot be detected externally.

With the foregoing and other objects in view there is provided, in accordance with the invention, an apparatus for reading instruction data from a code memory into an instruction FIFO, decoding the instruction data to obtain the instructions and forwarding the instructions to an instruction unit. The apparatus includes: an instruction FIFO having a storage capacity; an instruction unit; means for prefetching instruction data from a code memory and for buffer-storing the instruction data in the instruction FIFO until the instruction data is executed, the means also for decoding the instruction data to obtain corresponding instructions and for forwarding the instructions to the instruction unit; means for detecting a suitable program loop; means for storing instructions of the program loop in the instruction FIFO for a duration of a loop mode; means for reading the instructions of the program loop in a circulating fashion from the instruction FIFO and for forwarding the instructions of the program loop to the instruction unit; and means for terminating the loop mode based on a content of a jump instruction of the program loop.

In accordance with an added feature of the invention, the apparatus includes: means for starting a loop search mode based on an occurrence of a jump instruction and based on a current mode of the instruction FIFO; a tag register for storing a jump tag address in the loop mode; and a start tag register for storing an address of a next instruction that is in the instruction FIFO. Other features which are considered as characteristic for the invention are set forth in the appended claims.

Although the invention is illustrated and described herein as a method and an apparatus for reading instruction codes and for forwarding the corresponding instructions to the instruction unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1A and 1B show a flowchart illustrating the operation of additional logic that can be used to reduce the time loss caused by short instruction loops.

DESCRIPTION OF THE PREFERRED EMBODIMENTS

Figure 1B:
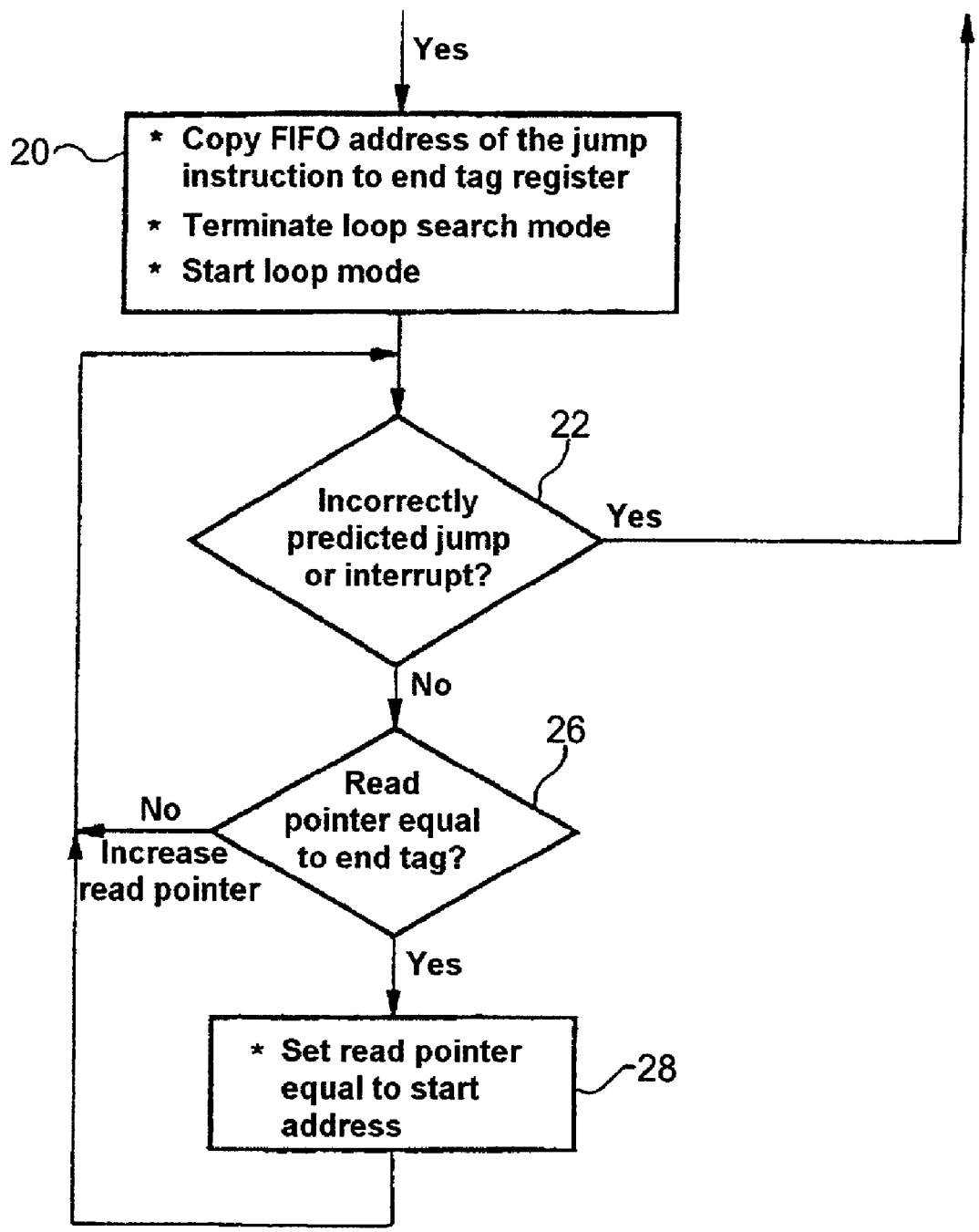

Referring now to the figures of the drawing in detail and first, particularly, to FIG. 1 thereof, there is shown a flowchart for inventive additional logic. This additional logic has a loop search mode for detecting and buffer-storing short program loops. The additional logic also has a loop mode for repeatedly forwarding these loops from the instruction FIFO to the execution unit of the processor. To buffer-store addresses, a tag register, a start tag register and an end tag register are used.

In the first step 10, during reloading of instructions into the instruction FIFO, polling is carried out to determine whether there is any return instruction which has been taken or has been predicted to have been taken, in order to detect a supposedly short program loop. If this is not the case, this polling is repeated until a conditional or unconditional return finally appears in the program execution. In this context, it is advantageous to detect only such returns that could possibly from a loop which could be stored in full in the instruction FIFO. By way of example, the selection can be made on the basis of whether the jump instruction points to an address in an area of the memory which was close to its instruction code.

In this case, a recognition feature of the jump instruction (called jump tag address below), such as the address of the subsequent linear jump instruction, the address of the jump instruction or the memory address of the previous linear jump instruction, is copied to the tag register (Step 12). In addition, the address of the register of the instruction FIFO which stores the instruction with the address of the jump destination is stored in the start tag register, since this register represents the start of the possible program loop in the instruction FIFO. The loop search mode is then started.

In this context, the instruction FIFO is filled with other instructions as described at the beginning, i.e. the write pointer circulates over the individual registers of the FIFO, with a series of polling operations being carried out whenever a new instruction is loaded into a register.

The first of this series of polling operations checks whether the write pointer is pointing to the start of the loop which may exist, that is to say whether that register of the instruction FIFO which is to have new information written to it has the address specified in the start tag register (Step 14). If the two addresses match, this means that the supposed loop exceeds the capacity of the instruction FIFO. The loop search mode is accordingly terminated, the content of the three tag registers (start tag register, end tag register and tag register) is declared invalid and the search for a loop starts again.

If the write pointer and the start tag register do not match, the next thing checked is whether there is a return instruction whose subsequent jump address does not match the original subsequent jump address stored in the tag register (Step 16). If this is the case, the program is in a supposed new loop or in a subordinate loop. The loop search mode is accordingly restarted, with the new values being written to the tag register and to the start tag register.

If the result of the polling operation was negative, a check is carried out to determine whether there is a tag hit, i.e. whether there is a short return instruction which refers to the memory address stored in the tag register (Step 18). If this is also not the case, an instruction is again fetched from the memory to the instruction FIFO and the three polling operations are repeated.

If, on the other hand, there is a tag hit, this means that a program loop has been detected which had been stored in full in the instruction FIFO. The address of the end of this loop, that is to say of that register of the FIFO in which the jump instruction had been stored, is stored in the end tag register, and the logic changes over from the loop search mode to the loop mode (Step 20).

This loop mode is characterized in that further reloading of instructions from the memory is stopped and only the instructions held in the instruction FIFO at this moment can now be forwarded to the execution unit.

Again, a few polling operations are carried out when each instruction is forwarded.

The first polling operation checks whether there is an interrupt or whether the designation of a jump instruction was incorrectly predicted (Step 22). In these cases, the loop mode is terminated, the content of the three tag registers is declared invalid and the logic starts at the beginning again by searching for a new loop (Step 24).

If the polling operation was negative, the next thing checked is whether the value of the read pointer pointing to the instruction FIFO matches the content of the end tag register (Step 26). If the two values do not match, the instruction is forwarded and the content of the read pointer is increased.

If the result of the last polling operation was positive, this means that the end of the program loop had been reached. In this case, the content of the start tag register is copied to the read pointer, and the program returns to the start of the loop (Step 28). The loop is thus repeatedly executed until either an interrupt occurs or the jump instruction no longer refers to the start of the program loop.

The specified logic is distinguished, in particular, by the fact that it itself intervenes only slightly in the control of the instruction FIFO. It is thus relatively simple to produce in technical terms and permits very high frequencies because of its shallow depth. The advantages of the loop mode are that the instructions of a loop do not constantly need to be reloaded and decoded. Since the instructions stored in the instruction FIFO can be accessed extremely quickly, the time saving is very high, particularly in the case of short program loops, and the operating speed of the entire program is significantly increased.

Another advantage is that the execution of this logic never results in any impairment of the system performance, that is to say it cannot be detected externally. Even an unsuccessful loop search mode does not affect the program execution, since, during this time, the instructions are loaded into the instruction FIFO from the memory in the normal way. In addition, the loop search mode detects any program loop having a return instruction which can be stored in full in the instruction FIFO. Additional identification of such loops or even new marking or control commands for the processor are not necessary.

We claim:

1. A method for reading instruction data from a code memory into an instruction FIFO, decoding the instruction data to obtain the instructions, and forwarding the instructions to an execution unit, the method which comprises:
    prefetching instruction data to read the instruction data from the code memory and reloading the instruction data into the instruction FIFO having a storage capacity;
    buffer-storing the instruction data in the instruction FIFO until the instruction data is executed;
    decoding the instruction data to obtain corresponding instructions;
    forwarding the instructions to the execution unit;
    during reloading the instruction data into the instruction FIFO, in a loop search mode, detecting if a short program loop exists, a short program loop being defined as having instructions that start with a first instruction, that end with a jump instruction, and that do not exceed the storage capacity of the instruction FIFO;
    if a short program loop is detected, changing from the loop search mode to a loop mode, during the loop mode:
        storing all of the instructions of the short program loop within the instruction FIFO;
        forwarding the instructions of the short program loop in a circular fashion from the instruction FIFO to the execution unit; and
        terminating the loop mode if either an interrupt occurs or if the jump instruction refers to an address other than that of the first instruction of the short program loop; and
    restarting the loop search mode upon termination of the loop mode.

2. The method according to claim 1, which comprises:
    if the loop mode is not activated, upon an occurrence of a jump instruction, starting a loop search mode which includes:
    storing a recognition feature for the jump instruction in a tag register, and
    storing an address of a next instruction in the instruction FIFO into a start tag register.

3. The method according to claim 2, which comprises terminating the loop search mode if the instruction FIFO address that is indicated in the start tag register is overwritten.

4. The method according to claim 2, which comprises providing the recognition feature for the jump instruction as a feature that is selected from the group consisting of a memory address of the jump instruction, a memory address of a previous linear jump instruction, and a memory address of a subsequent linear jump instruction.

5. The method according to claim 4, which comprises terminating the loop search mode if the instruction FIFO address that is indicated in the start tag register is overwritten.

6. The method according to claim 2, which comprises:
    storing a new jump tag address in a tag register;
    storing into the start tag register, an address of a next instruction that is in the instruction FIFO; and
    upon an occurrence of a further jump instruction in the loop search mode that has been started, restarting the loop search mode if a jump tag address of a current jump instruction does not match the new jump tag address that had been previously stored in the tag register.

7. The method according to claim 2, which comprises:
    storing in an end tag register, an address of a subsequent jump instruction that is within the instruction FIFO; and
    terminating the loop search mode and starting the loop mode if a return instruction arises having a jump tag address which matches a jump tag address that has been stored in the tag register.

8. The method according to claim 1, which comprises, in the loop mode, reading no further data into the instruction FIFO.

9. An apparatus for reading instruction data from a code memory into an instruction FIFO, decoding the instruction data to obtain the instructions, and forwarding the instructions to an execution unit, the apparatus comprising:

an instruction FIFO having a storage capacity;

an execution unit;

means for prefetching instruction data from a code memory and for reloading and buffer-storing the instruction data in said instruction FIFO until the instruction data is executed, said means also for decoding the instruction data to obtain corresponding instructions and for forwarding the instructions to said execution unit;

means for, in a loop search mode, detecting a short program loop defined as having instructions that start with a first instruction, that end with a lump instruction, and that do not exceed the storage capacity of the instruction FIFO;

means for changing from the loop search mode to a loop mode upon detection of a short program loop;

means for storing instructions of the short program loop in said instruction FIFO for a duration of a loop mode;

means for reading the instructions of the short program loop in a circular fashion from said instruction FIFO and for forwarding the instructions of the short program loop to said execution unit;

means for terminating the loop mode if an interrupt occurs or based on a content of a jump instruction of the short program loop; and means for restarting the loop search mode upon termination of the loop mode.

10. The apparatus according to claim 9, comprising:

means for starting a loop search mode based on an occurrence of a jump instruction and based on a current mode of said instruction FIFO;

a tag register for storing a jump tag address in the loop mode; and a start tag register for storing an address of a next instruction that is in said instruction FIFO.

* * * * *

UNITED STATES PATENT AND TRADEMARK OFFICE
CERTIFICATE OF CORRECTION

PATENT NO. : 7,093,112 B2
APPLICATION NO. : 09/953723
DATED : July 15, 2006
INVENTOR(S) : Steffen Sonnekalb et al.

Page 1 of 1

It is certified that error appears in the above-identified patent and that said Letters Patent is hereby corrected as shown below:

<u>Column 7,</u>

Lines 9-10, "to obtain corresponding instructions" should read

-- to obtain corresponding instructions --.

Line 14, "lump" should read -- jump --.

Signed and Sealed this

Sixteenth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,093,112 B2 | Page 1 of 1 |
| APPLICATION NO. | : 09/953723 | |
| DATED | : August 15, 2006 | |
| INVENTOR(S) | : Steffen Sonnekalb et al. | |

It is certified that error appears in the above-identified patent and that said Letters Patent is hereby corrected as shown below:

<u>Column 7,</u>

Lines 9-10, "to obtain
      corresponding instructions" should read

-- to obtain corresponding instructions --.

Line 14,    "lump" should read -- jump --.

This certificate supersedes Certificate of Correction issued January 16, 2007.

Signed and Sealed this

Sixth Day of February, 2007

JON W. DUDAS
*Director of the United States Patent and Trademark Office*